(12) United States Patent
Venola

(10) Patent No.: US 6,305,093 B1
(45) Date of Patent: Oct. 23, 2001

(54) HANGER TOOL TO FACILITATE CENTERING AND HANGING OF A COMPONENT

(76) Inventor: Penelope E. Venola, 2197 Santa Ana Ave., Costa Mesa, CA (US) 92627

( * ) Notice: Subject to any disclaimer, the term of this patent is extended or adjusted under 35 U.S.C. 154(b) by 0 days.

(21) Appl. No.: 09/396,573

(22) Filed: Sep. 15, 1999

(51) Int. Cl.⁷ .................... G01B 3/04; G01C 9/28
(52) U.S. Cl. .................... 33/451; 33/613; 33/492
(58) Field of Search .................... 33/613, 645, 483, 33/487, 492, 494, 451, 670

(56) References Cited

U.S. PATENT DOCUMENTS

| | | | |
|---|---|---|---|
| 563,510 | * 7/1896 | Savidge | 33/492 |
| 1,877,341 | 9/1932 | Kurtz, Jr. | 33/492 |
| 2,438,653 | 3/1948 | Ware | 33/483 |
| 2,554,099 | 5/1951 | Ermold | 33/487 |
| 2,579,664 | * 12/1951 | Gleasman | 33/492 |
| 2,633,640 | 4/1953 | Bucsko | 33/451 |
| 2,939,219 | 6/1960 | Georges | 33/492 |
| 3,416,485 | * 12/1968 | Phillips | 33/494 |
| 3,545,091 | 12/1970 | Sebastiani | 33/451 |
| 4,241,510 | 12/1980 | Radecki | 33/451 |
| 4,660,292 | 4/1987 | Richardson | 33/451 |
| 4,750,270 | * 6/1988 | Kundikoff | 33/494 |
| 5,451,027 | 9/1995 | McHenry | 33/613 |
| 5,813,127 | * 9/1998 | Blevins | 33/494 |
| 6,029,362 | * 2/2000 | Miodragovic | 33/613 |

* cited by examiner

*Primary Examiner*—G. Bradley Bennett
(74) *Attorney, Agent, or Firm*—Fulwider Patton Lee & Utecht LLP

(57) ABSTRACT

A leveling and centering tool including a linear rail having a centering scale on one edge thereof and including numerals ascending upwardly in opposite directions from a centering point. A measurement scale having incremental spaces twice the size of the spacing on the centering scales and including the opposite edge of the rail. Leveling bubbles are incorporated on the scale and it may include a hand grasp.

19 Claims, 2 Drawing Sheets

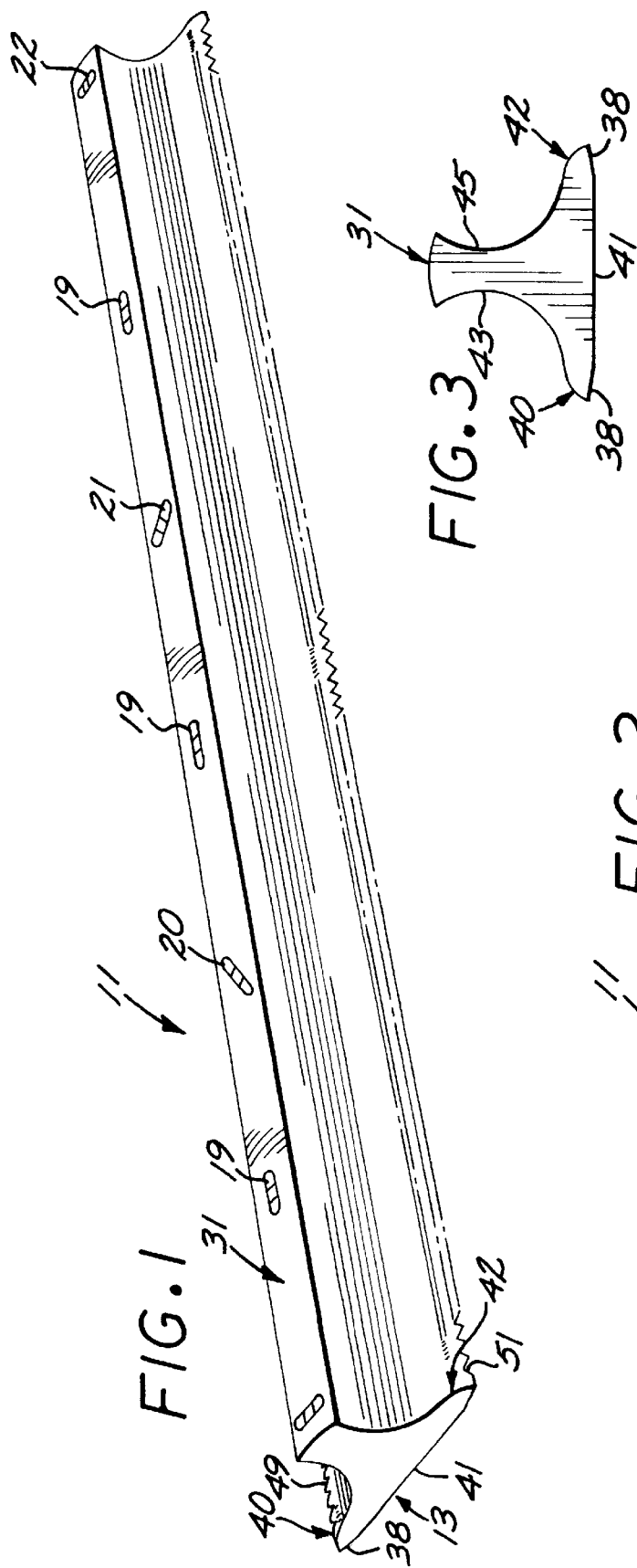
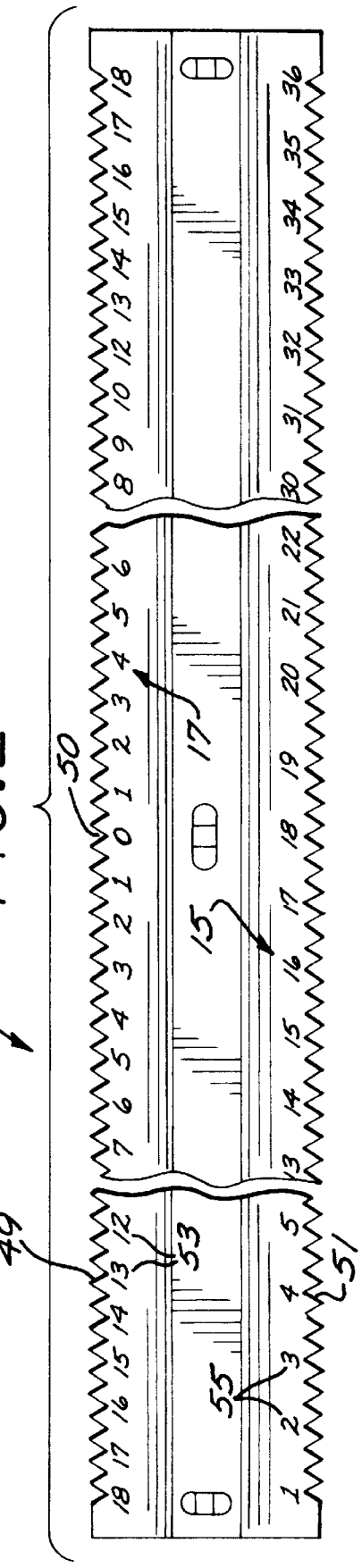

HANGER TOOL TO FACILITATE CENTERING AND HANGING OF A COMPONENT

BACKGROUND OF THE INVENTION

1. Field of the Invention

The present invention relates to a device to facilitate centering and hanging of a component at a predetermined angle.

2. Description of the Prior Art

A task often faced by a workman is hanging of a component from a vertical wall by means of hangers spaced apart a selected distance to hold such component at a predetermined angle. This task is confronted by workmen involved in hanging conventional pictures from vertical walls as well as those hanging various types of rails and wall components, such as handicapped rails which must angle at a selected angle often dictated by building codes and the like.

As an example, in the case of picture frames, a difficult and frustrating task involves measuring and adjusting the picture frame placement, particularly when the task is to be undertaken by one individual. At times feats of mental gymnastics are required to first determine the size of the mountable article, then compute the proper placement of hooks to be spaced along the wall to locate the picture at the desired location.

In the past attempts have been made to resolve the known difficulties of picture hanging by a variety of devices. Early on it was proposed to combine a straight edge with a level tool which was constructed using a unified design. Such an apparatus can be seen in U.S. Pat. No. 2,633,640 to Bucsko intended to permit the user to ascertain the proper placement of an object with respect to its angulation, while at the same time allowing the user to mark such placement by running a pencil or other marking utensil along the straight edge. However, this still did not assist the user with centering an object or with proper placement of hooks to suspend the picture at a selected location on a wall.

More recently it was proposed in U.S. Pat. No. 4,241,510 to Radecki that one combine a variety of rulers to form an inverted T-shaped design. This ruler design includes slidable members used for engaging a hanging wire and a level to aid in positioning the device at a desired wall location. While this device assisted in the positioning of the hooks and guide wires on the article to be hung on the wall it was difficult to use and did not accomplish all the desired objects of the present invention. Furthermore, this invention utilized a variety of moving parts and requires some degree of dexterity to manipulate for the desired results.

Similarly, U.S. Pat. No. 4,660,292 to Richardson combined a ruler with a horizontal level, a vertical plumb and a straight edge. This ruler was devised to provide direct read measurements between two points up to a distance equal to twice the overall length of the tool. While target levels were provided for easy leveling of an object, this device required the user to adjust and modify the ruler portion of the apparatus in order to achieve the proper measurement of the object. There still remained need for an easy and convenient way to center and place a hanging device.

It can be seen that even after a variety of improvements there still is a need to develop a tool which can be used by an individual to fulfill a variety of functions related to the hanging of a picture, or other article, on the wall. While these earlier attempts have made substantial progress in achieving the desired tool, and furthermore, that while these attempts have solved many of the problems that the present invention solves, there remained a distinct need for a unified and simple to use tool which would enable the user to measure the object, center the wire device or hanger which is mounted to the article itself, locate and mark the center location on the wall, properly establish the angle therefor and mark the location for spaced apart hangers to match the article being hung. While in the past each of these steps had to be taken using multiple tools and required numerous steps before achieving the desired results, the present invention has provided a quick, easy to use and inexpensive solution without the difficulties associated with moving parts.

SUMMARY OF THE INVENTION

A hanger tool to facilitate centering and hanging of a component from a pair of hangers to be located on a vertical wall at a predetermined angle to the horizontal. The tool includes an elongated rail to be positioned at the predetermined angle. The rail includes a centering scale along one edge having numerical centering indicia progressing distally at equal increments from a centering point. A second scale is included having numerical indicia spaced apart at increments double those of the increments in the centering scale so that desired hanger spacing may be measured on such second scale and the numeral corresponding with that distance selected. The rail may then be centered on such centering marker and the selected numeral utilized to select the corresponding numeral on such first scale on opposite sides of the center point to locate such hangers. A leveling device, such as a bubble, is included on the rail for indicating when such rail is at the predetermined angle.

The method of the present invention involves use of a scale of the type described wherein the distance between a pair of hangers is determined. The center marker on the centering scale may be positioned on a center point on a vertical wall and the rail angled at the predetermined angle. One-half the predetermined distance may then be counted off from the center marker to establish the location on such centering scale for location of the respective hangers.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1 is a perspective view of a leveling and centering device embodying the present invention;

FIG. 2 is a broken top plan view, of the device shown in FIG. 1;

FIG. 3 is a left end view of the device shown in FIG. 1; and

DETAILED DESCRIPTION OF THE PREFERRED EMBODIMENT

Figure 4:
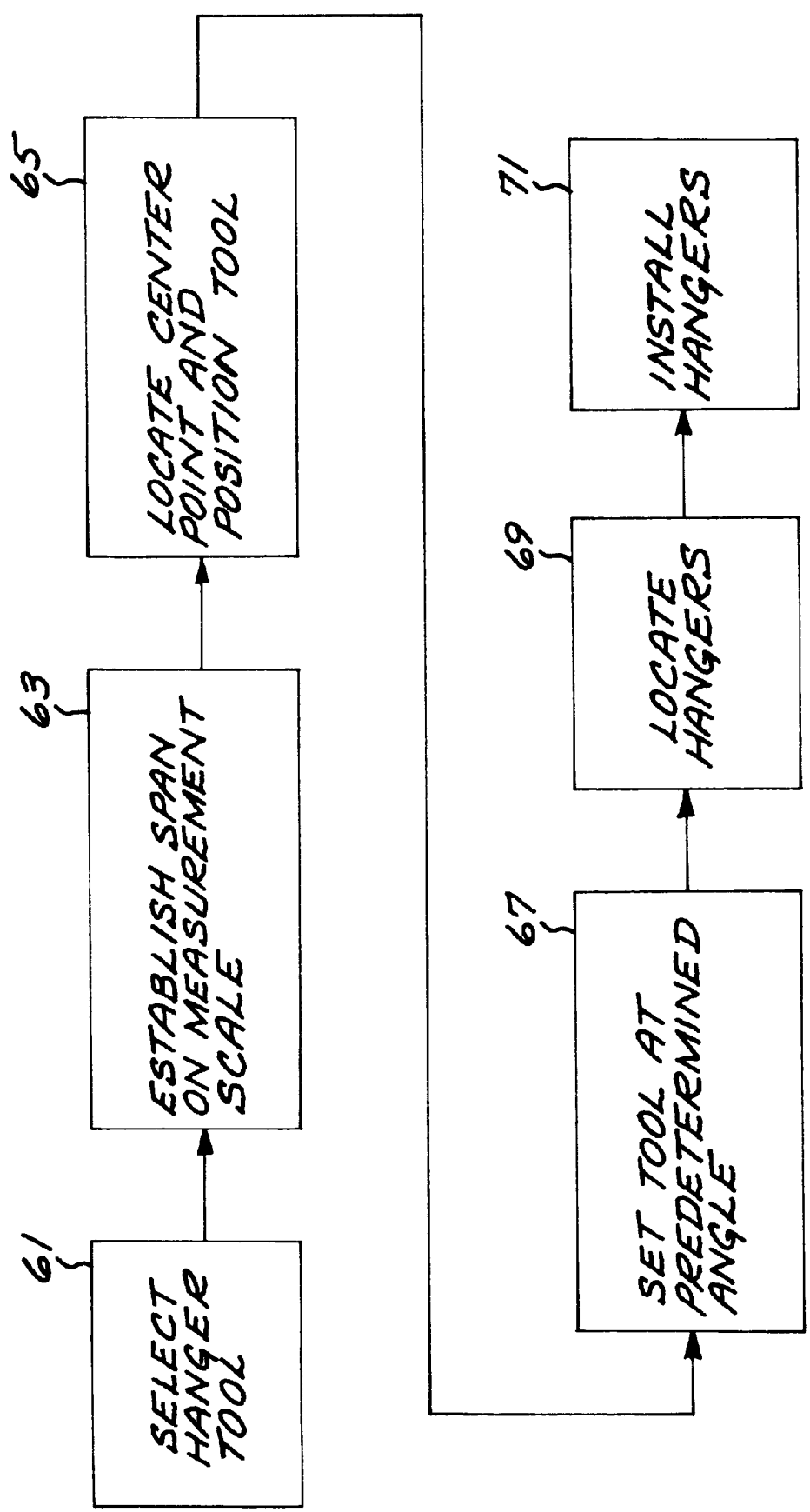
FIG. 4 is a block diagram showing the method of the present invention.

Referring to FIGS. 1 and 2, the hanger tool of the present invention includes, generally, an elongated, rail 11 configured with a base 13 having opposite edges which form a bottom measurement scale 15 and a top centering scale 17. The measurement scale 15 includes equally spaced indicia marks 55 having major increment lines spaced apart one inch. In the preferred embodiment, these increment marks are labeled with numerals identifying one inch increments up to 36 inches. The centering scale 17 includes a center point 50 marked C and likewise includes indicia in the form of numeral 53 ascending upwardly in opposite directions from the centering point C and spaced apart fractions of an inch, which in the preferred embodiment are actually one-half inch increments. A plurality of level bubbles 19, 20, 21 and 22 at different predetermined orientations are mounted on the rail to indicate the orientation thereof. In the preferred embodiment, the rail is a T-shaped cross section to define an ergonomically shaped, laterally projecting, longitudinal flange 31 defining a hand grasp portion.

It will be appreciated that the tool rail 11 may be constructed of many different configurations and lengths for achieving numerous different tasks. As an example, for picture frame hanging, it could be on the order of 36 inches long and, for handicap rail hanging, it could be on the order of 72 inches long or even longer. For an exemplary description, I have elected to focus on the construction and use of this tool for hanging pictures or the like. However, the scope of the invention itself is to be measured, not by the specific description set forth herein but rather, by the claims appended hereto.

The tool rail 11 may be constructed of wood, plastic, acrylic or any other desirable material. It could be in the form of a flat flexible plate, with or without a special hand grip, and, if desired, could be constructed of transparent material. In the preferred embodiment, such rail is T-shaped to be constructed with the base 13 having a planar bottom surface 41, the opposite flanges forming base flanges, generally designated 40 and 42, and the stem thereof forming the hand grasp 31 (FIG. 3). Referring to FIG. 3, the cross-section of the stem defining the hand grasp 31 is formed with generally semi-circular concave, opposite sides 43 and 45 so that the opposite sides thereof at the distal top edge curve outwardly to form an enlarged top extremity enhancing the ergonomically defining a pair of oppositely projecting lips terminating in a laterally curved crown shaped hand grasp configuration.

Printed on the top sides of the opposite base flanges 40 and 42 are the respective centering and measuring scales 15 and 17, respectively. The opposite edges of the respective base flanges 40 and 42 are formed with a somewhat saw-tooth shape to provide respective V notches 49 and 51 associated with the respective numerals 53 and 55 forming the respective scales 15 and 17. At the opposite edges of the planar surface 41, the bases angle upwardly and outwardly at 45° to such surface to form respective guide edges 38 (FIG. 3) at the crotches of the respective notices to guide a nail nested there against at an angle of 45° to such flat surface.

The level devices 19, 20, 21 and 22 may be of any desirable construction, such as pendulum indicators, digital read-outs or, as in the preferred embodiment, bubble tubes. The tubes 19 extend in the longitudinal direction to provide a horizontal indicator, the tube 20 at 30° to the axis to thus provide an indication when the rail is inclined in one direction at 30° to the axis. The bubble 21 is inclined in 30° in the opposite orientation from that of the bubble 20 to thus indicate a 30° inclination in the opposite direction. The bubble tube 22 projects transversely of the axis of the rail to provide a vertical leveling orientation.

In operation, it will be appreciated that the cross section and length of the physical embodiment of the tool of the present invention may be selected for different applications. That is, a tool intended only for hanging conventional rectangular picture frames may well include only the horizontal bubbles 19 or possibly horizontal bubbles 19 and vertical bubbles 22. To hang a picture, a do-it-yourselfer might select a hanger tool of the shape and length disclosed for the preferred embodiment as at 61 (FIG. 4). The location might be selected on the wall where the picture is to be hung and the center line established on that wall as at 65. The span between a pair of hangers to be utilized will be then established such as, for example, 14 inches as at 63. This dimension may, for example, be established by measuring the span between the desired locations for such hangers utilizing the measurement scale 15, thus establishing the 14 inch dimension. Then, the workman will establish the height on the wall at the which the hanger is to be located. The center point C identified on the centering scale 17 by the numeral 0 at 50 will then be located on the vertical center line so established with the scale 17 positioned at the height desired for such hangers. The rail may then be rotated on the center point to orient the level bubble 21 on a horizontal plane as at 67 (FIG. 4). The workman need then only select the numerals 14 on opposite sides of the center line C and mark the position on the wall corresponding with the desired eventual location of the hangers as at 69. It will be appreciated that if the hangers are in the form of conventional nails or screws, the nail or screw can merely be inserted in the notch 49 corresponding with the numeral 14 and then driven or screwed into the wall to serve as the picture hanger as at 71. By nesting such hanger against the guide surface 38, it will be directed at 45° to the vertical face of the wall (FIG. 3).

It will be appreciated that a similar procedure might be followed for the hanging of shelves, towel bars or the like wherein the distance between the screw holes or the like on such towel bars can be measured by the measurement scale 15 and the numeral 55 selected indicative of the span between such screw holes may be then translated over to the center scale 17 as described above and the procedure repeated similar to that for hanging of the picture.

In the case of inclined rails or other components, a hanger tool will be selected with a leveling device 20 or 21 corresponding with the inclination from horizontal desired for the component being hung. As an example, should it be desirable to mount a rail at 30° to the horizontal, a tool may be selected with the leveling tube 20 or 21 angling at 30° to the horizontal. Then, the workmen can, as described above, determine the span between the screw holes by laying the scale 15 thereon and picking off the numeral 55 corresponding with such span. As an example, should the distance between such screw holes be 18 inches, the workman will then position the center line C on the location corresponding with the desired center location desired for the rail and the rail angled to the inclination at which the bubble in the tube 20 or 21 selected is centered. This then establishes the desired angle for the subsequent rail as installed. The numerals 18 on the scale 17 on opposite sides of the center line C may then be marked or possibly a pilot hole drilled utilizing the notch 49 to thus locate the desired final position of the hanger screw holes as at step 67 (FIG. 4). The workman may then form the desired size of hole for the hanger at the respective hanger locations and the hangers installed as at step 71.

As can be seen from the foregoing, the apparatus of the present invention will facilitate the measuring, centering and leveling of components to be hung from fasteners on a vertical wall or even an overhead wall. Various modifications and changes may be made with regard to the foregoing detailed description without departing from the spirit of the invention. The device is inexpensive and straightforward to use. The method of use is particularly efficient and affords accurate and reliable results.

What is claimed is:

1. A hanger tool to facilitate centering and hanging of a component on a vertical wall at a predetermined angle to the horizontal and comprising:

an elongated rail to be positioned at said predetermined angle on said wall, said rail being formed with a transverse cross section to define at least one laterally extending base flange having a planar base surface facing in one direction for abutting flush against said wall and a leg projecting from said base flange opposite said one direction to define a hand grasp spaced distally from said base flange;

a centering scale on said base flange, including centering indicia progressing distally at equal increments from a center point; and a leveling device on said rail for indicating when said rail is at said predetermined angle whereby a user may grasp said hand grasp with a hand and position said base surface against said wall with his or her hand spaced distally from said base surface, and may then determine the spacing between hangers to hang said component and locate said center point on said wall and select the centering indicia on said scale corresponding with the location desired for said hangers to establish the location therefor.

2. The tool of claim 1 for hanging a rectangular picture frame and wherein:

said leveling device is operative to indicate when said rail is level.

3. The tool of claim 1 for hanging a handicap rail angling at a selected angle to the horizontal and wherein:

said leveling device is operative to indicate when said rail is at said selected angle.

4. The tool of claim 1 that includes:

a measuring scale on said rail having measurement indicia thereon spaced apart sequentially equal to twice said equal increments.

5. The tool of claim 1 wherein:

said leveling device is operative to indicate when said rail is oriented vertically.

6. The tool of claim 1 wherein:

said leveling device is operative to indicate when said rail is at 30° to the horizontal.

7. The tool of claim 1 that includes:

a hand hold on said rail.

8. A tool as set forth in claim 1 that includes:

a plurality of level devices mounted on said rail.

9. A tool as set forth in claim 8 wherein:

said level devices angled in a variety of preset positions along said rail.

10. A tool as set forth in claim 1 wherein:

said rail is formed with notches spaced therealong at said equal increments.

11. A tool as set forth in claim 1 wherein:

said rail is configured in an inverted T shape to form a pair of flanking base flanges projecting in opposite directions.

12. A tool as set forth in claim 1 wherein:

said indicia includes numerals.

13. A tool as set forth in claim 12 wherein:

said numerals are spaced apart at increments of one inch.

14. A tool as set forth in claim 1 wherein:

said scale is positioned on one edge of said rail.

15. A tool as set forth in claim 1 wherein:

said base flange is formed with said planer base surface configured with at least one edge angling outwardly from said planar base surface at an angle of 45° to the plane of said surface to form a hanger guide.

16. A tool as set forth in claim 1 wherein:

said rail is 36 inches long.

17. A hanger tool to facilitate centering and hanging of a component on a vertical wall at a predetermined angle to the horizontal and comprising:

a linearly elongated generally T-shaped in transverse cross section rail to be positioned at said predetermined angle and configured with a pair of oppositely directed base flanges defining a planar base surface and a laterally extending leg defining a hand grasp running coextensive along the length of said member, the cross section of said hand grasp being formed with generally semicircular concave, opposite sides curving outwardly away from one another and formed at their distal extents with oppositely directed lips cooperating to form an enlarged in cross section distal extremity;

at least one of said base flanges being formed with sawtooth shaped edges defining a plurality of notches for alignment thereon of hangers for hanging said component;

a centering scale on said at least one said flange, including centering indicia progressing distally at equal increments from a center point;

a measuring scale on the other of said flanges including consecutive numerical indicia spaced apart at equal increments wherein the lowest indicia is located at the proximate end of said flange and the highest indicia is located at the distal end; and a plurality of leveling devices located on said member to work both individually and in consort for indicating when said member is at said predetermined angle.

18. A method of hanging a component from a vertical wall by hangers to be spaced apart a predetermined distance and to angle at a predetermined angle to the horizontal, the method including:

selecting an elongated rail having a transverse cross section defining at least one laterally extending base flange having a planar base surface formed with at least one edge angled outwardly from the plane of said surface to form a hanger guide and a leg projecting generally orthogonally from said base flange to define a hand grasp, said rail also including a leveling indicator thereon for indicating said predetermined angle, and further including a center scale thereon including centering indicia leading progressively outwardly in opposite directions from a center point;

establishing said predetermined distance;

selecting the center point between said predetermined distance on said wall;

placing said rail on said wall at said predetermined angle with said centering indicia at said center point; and selecting said predetermined distance off said indicia on said scale to establish the location for said hangers.

19. The method set forth in claim 18 for hanging a rectangular picture frame and including:

selecting said hangers as picture hangers;

determining the desired space between said hangers and said predetermined distance; and when said predetermined distance is established on said wall, marking said distance on said wall.

* * * * *